United States Patent [19]

Sato et al.

[11] Patent Number: 5,173,342
[45] Date of Patent: Dec. 22, 1992

[54] LIQUID CRYSTAL ORIENTATION FILM AND PROCESS FOR MAKING THE SAME

[75] Inventors: Shigehiro Sato; Keizo Nakajima, both of Osaka; Hirofumi Wakemoto, Neyagawa; Shoichi Ishihara, Katano, all of Japan

[73] Assignee: Matsushita Electric Industrial Co., Ltd., Osaka, Japan

[21] Appl. No.: 585,215

[22] Filed: Sep. 20, 1990

[30] Foreign Application Priority Data

Sep. 20, 1989 [JP] Japan .................................. 1-243790

[51] Int. Cl.$^5$ ........................................... G02F 1/1337
[52] U.S. Cl. ........................................... 428/1; 359/75; 359/78
[58] Field of Search .................. 359/75, 78, 76; 428/1

[56] References Cited

U.S. PATENT DOCUMENTS 4,781,439  11/1988  Yokokura et al. ..................... 528/26
4,856,875  8/1989  Kozaki et al. .......................... 359/75

FOREIGN PATENT DOCUMENTS 62-174725  7/1987  Japan .

Primary Examiner—Alexander S. Thomas
Attorney, Agent, or Firm—Wenderoth, Lind & Ponack

[57] ABSTRACT

A liquid crystal orientation film comprises a support film formed on a substrate, and an orientation-control film formed on and chemically coupled with the support film. The orientation-control film has a trifluoromethyl group and is in direct contact with a liquid crystal in a liquid crystal display device.

4 Claims, 1 Drawing Sheet

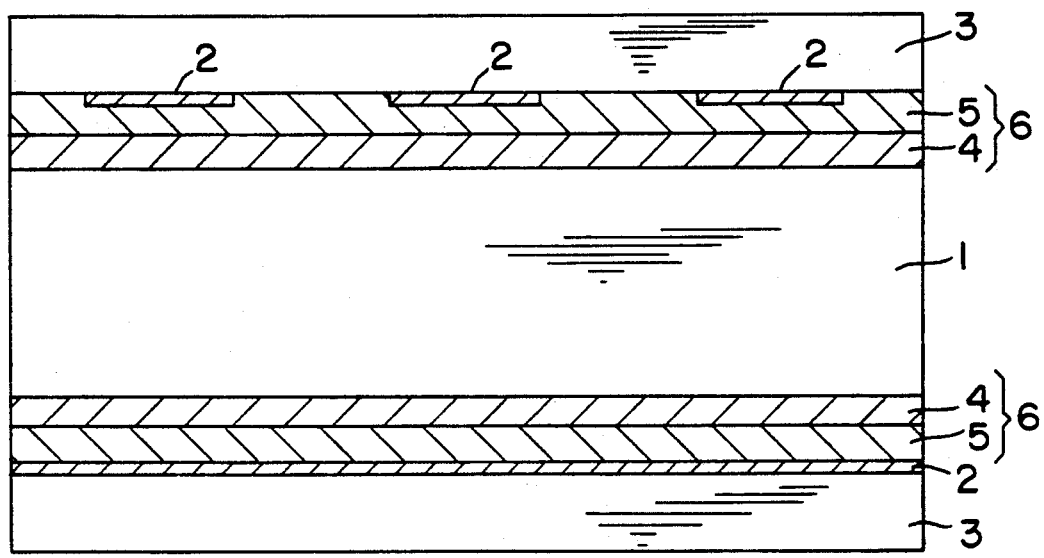

LIQUID CRYSTAL ORIENTATION FILM AND PROCESS FOR MAKING THE SAME

BACKGROUND OF THE INVENTION

1. Field of the Invention

This invention relates to an orientation film used in a liquid crystal display device for orienting liquid crystal molecules in a certain direction and also to a process for making such an orientation film. More particularly, this invention relates to an orientation film for a liquid crystal display device, such as twisted nematic (TN) liquid crystal display device, super twisted nematic (STN) liquid crystal display device, ferroelectric liquid crystal display device and super homeotropic (SH) liquid crystal display device, wherein a liquid crystal is intervened between a pair of substrates each having an electrode on a surface facing the liquid crystal, and also to a process for making the same.

2. Description of the Prior Art

A liquid crystal display device having an orientation film of a long-chain polymer having a fluorinated substituent, e.g. a fluoroalkyl chain, is disclosed, for example, by Narita et al in Japanese Patent Laid-open No. 62-174725. This patent application deals with an STN liquid crystal display device which is characterized by using an orientation film consisting of a polyamide- or polyimide-based straight-chain polymer having a fluoroalkyl Chain Of the formula, $C_nH_mF_{2n+1-m}$, wherein n is a natural number and m is zero or a natural number not larger than 2n, and liquid crystal molecules having a soft structure. The orientation film in this patent application has the fluoroalkyl group not only in portions directly contacting the liquid crystal, but also in the inside of the orientation film not contacting the liquid crystal and also in the surface of the orientation film contacting the substrate.

Accordingly, the movement of the polymer chain in the orientation film becomes active by heating, so that the density of the fluoroalkyl group in the surface directly contacting the liquid crystal is changed. The change in the surface density of the fluoroalkyl group will vary the orientation of the liquid crystal. The present invention contemplates to provide an orientation film which does not change the orientation of liquid crystals before and after heating.

SUMMARY OF THE INVENTION

An object of the invention is to provide a liquid crystal orientation film which has good capability of orientation and by which the orientation of liquid crystal molecules scarcely change by heating.

In order to achieve the above object, the present invention provides a liquid crystal orientation film which comprises a support film formed on a substrate and an orientation-control film formed on and chemically coupled with the support film and having a trifluoromethyl group. The support film and the orientation-control film are used in a liquid crystal display device of the type wherein a liquid crystal is intervened between a pair of substrates each having an electrode on a surface facing the liquid crystal.

The fabrication process of the liquid crystal orientation film according to the invention comprises the step of forming a support film on a substrate and a subsequent step of chemically coupling a precursor for an orientation-control film to the support film on the surface thereof.

BRIEF DESCRIPTION OF THE DRAWING

The sole FIGURE is a sectional view of one embodiment of a liquid crystal display device using a liquid crystal orientation film according to the invention.

DESCRIPTION OF THE PREFERRED EMBODIMENTS

The liquid crystal orientation film of the invention is described with reference to the accompanying drawing. In the FIGURE, a liquid crystal 1 is in contact with a pair of substrates 3 each having an electrode 2 at a surface facing the liquid crystal 1. On the surface of each electrode 2 is formed a support film 5 and an orientation-control film 4 having a trifluoromethyl group and chemically coupled with the support film 5. The combination of the orientation-control film 4 and the support film 5 is a liquid crystal orientation film 6.

The substrate 3 may be any transparent plate or sheet such as of glass, acrylic resins, polycarbonate resins. Of these, glass is preferred in view of the reliability thereof. If one of the substrates 3 is made of a silicon wafer, it will be possible to provide a reflection-type liquid crystal display using the silicon wafer as both a substrate and a reflective layer. The electrode 2 may be any known transparent electrode of ITO, $SnO_2$ or the like. With the reflection-type liquid crystal display, the electrode 2 on one substrate 3 may be made of a material serving also as a reflective layer, such as aluminum or chromium. In order to drive the liquid crystal 1 on a pixel by pixel basis, the electrode 2 may be formed in a desired pattern, or driving transistors or diodes may be formed on the surface of the substrate 3 which faces the liquid crystal 1.

The orientation-control film 4 containing a trifluoromethyl group may be chemically coupled with the support film 5 and may be made of any material capable of orienting the molecules of the liquid crystal 1. Most preferably, the orientation-control film 4 may be made of an organic silicone compound having a trifluoromethyl group. Preferably, the trifluoromethyl group may be one wherein the end group of the alkyl chain directly joined to a silicon atom is fluorinated.

The most preferable support film 5 chemically coupled with the orientation-control film 4 is a polymer film having a hydroxyl group. Films of polymers having a hydroxyl group in the molecule such as, for example, polyvinyl alcohol, starch, cellulose and silicon polymers, and those films obtained by subjecting polymer films such as polyethylene and polystyrene to a plasma treatment in order to cause the hydroxyl group in the surface thereof, may be used as the support film 5. Of these polymers, polyvinyl alcohol is most preferable because of the ease in film formation and the high density of hydroxyl groups.

Preferably the orientation-control film 4 may be formed after thermal treatment of the support film 5 at temperatures of not lower than 120° C. By the thermal treatment, the moisture content in the support film 5 is reduced and the hydrogen coupling through hydroxyl groups becomes stronger, so that the film 5 is more sparingly soluble in solvents for a precursor of the orientation-control film. This ensures that at the time of the formation of the orientation-control film 4, the support film 5 is not dissolved with improved reliability.

For the formation of the orientation-control film 4, a precursor for the orientation-control film may be preferably reacted with the support film 5 made of a polymer film having hydroxyl groups. Examples of the precursor include organic silicon compounds having a trifluoromethyl group and are preferably those compounds of the structural formula, $CF_3$-R-Si-$X_3$, wherein R represents $(CF_2)_m(CH_2)_2$ in which m is an integer of from 0 to 3, and X represents a hydrolyzable group.

Examples of the hydrolyzable group include chlorine, bromine, a methoxy group, an ethoxy group and the like. Most preferable precursors are those of the formula, $CF_3$-R-Si-$Cl_3$, wherein R represents $(CF_2)_m(CH_2)_2$ in which m is an integer of from 0 to 3. The compound is polymerized by reaction with the hydroxyl group or a small amount of moisture in or on the surface of the support film 5. As a result, the orientation-control film 4 is formed on the support film 5. In order to convert the precursor to the orientation-control film, heating at temperatures of not lower than 20° C. is necessary. The heating temperature depends on the type of hydrolyzable group and is not lower than 20° C. for chlorine or bromine and not lower than 120° C. for a methoxy or ethoxy group.

For the fabrication of a liquid crystal display device, two substrates 3 each having the orientation film 6 are provided. The orientation film 6 is subsequently rubbed on the surface thereof with cloth such as of nylon or rayon. The paired substrates are kept at a predetermined distance so that the liquid crystal 1 is in contact with the surface of the respective orientation films 6. The liquid crystal 1 is charged into the space established between the substrates 3 while keeping at a given temperature, thereby obtaining a liquid crystal display device. The temperature at which the liquid crystal 1 is charged between the substrates 3 is generally in the range of from 20° C. to 80° C. for nematic liquid crystals and in the range of from 70° C. to 120° C. for ferroelectric liquid crystals.

The liquid crystal 1 may be charged either after lowering the pressure in the space between the substrates 3 or at an atmospheric pressure. Aside from the above charging procedures, the liquid crystal 1 may be dropped over one of the substrates 3, followed by attaching the other substrate 3 to the dropped substrate.

In the FIGURE, the liquid crystal orientation film 6 is formed on each substrate 3, but may be formed on one of the substrates 3.

The present invention will be described by way of examples.

EXAMPLE 1 AND 2

A circular disk-shaped electrode with an electrode area of 2 $cm^2$ was formed, by sputtering of ITO, on each of 1.1 mm thick #7059 glass substrates available from Corning Co. Polyvinyl alcohol (PVA 117, available from Kuraray Ltd. and hereinafter referred to simply as PVA) was spincoated on the substrate. The PVA film-coated substrate was dried at 120° C. for 1 hour, followed by placing in carbon tetrachloride and introducing 0.1% of each of organic silicon compounds having a trifluoromethyl group, indicated in Table 1, while agitating the liquid by a mechanical stirrer. After reaction at 25° C. for 10 minutes, the respective substrates were washed with chloroform and dried at 25° C. to obtain liquid crystal orientation films of Examples 1 and 2.

The respective orientation films were rubbed on the surface thereof. Two substrates were bonded with an adhesive at a distance of 2μm so that the orientation films were facing each other. The rubbing directions were arranged parallel to each other with respect to the two substrates.

Ferroelectric liquid crystal, ZLI-3654, available from E. Merck Co., was charged at 100° C. into the space between the two substrates to obtain liquid crystal display devices of Examples 1 and 2.

EXAMPLE 3 AND 4

A circular disk-shaped electrode with an electrode area of 2 $cm^2$ was formed, by sputtering of ITO, on each of 1.1 mm thick #7059 glass substrates available from Corning Co. Polyvinyl alcohol (PVA 117, available from Kuraray Ltd.) was spincoated on the substrate. The PVA film-coated substrate was dried at 170° C. for 1 hour, followed by placing in carbon tetrachloride and introducing 0.1% of each of organic silicon compounds having a trifluoromethyl group, indicated in Table 1, while agitating the liquid by a mechanical stirrer. After reaction at 25° C. for 10 minutes, the respective substrates were washed with chloroform and dried at 120° C. to obtain liquid crystal orientation films of Examples 3 and 4.

The respective orientation films were rubbed on the surface thereof. Two substrates were bonded with an adhesive at a distance of 2μm so that the orientation films were facing each other. The rubbing directions were arranged parallel to each other with respect to the two substrates.

Ferroelectric liquid crystal, ZLI-3654, available from E. Merck Co., was charged at 100° C. into the space between the two substrates to obtain liquid crystal display devices of Examples 3 and 4.

EXAMPLES 5 AND 6

A circular disk-shaped electrode with an electrode area of 2 $cm^2$ was formed, by sputtering of ITO, on each of 1.1 mm thick #7059 glass substrates available from Corning Co. Polyethylene oxide (PEO) was spincoated on the substrate. The PEO film-coated substrate was dried at 120° C. for 1 hour, followed by placing in carbon tetrachloride and introducing 0.1% of each of organic silicon compounds having a trifluoromethyl group, indicated in Table 1, while agitating the liquid by a mechanical stirrer. After reaction at 25° C. for 10 minutes, the respective substrates were washed with chloroform and dried at 25° C. to obtain liquid crystal orientation films of Examples 5 and 6.

The respective orientation films were rubbed on the surface thereof. Two substrates were bonded with an adhesive at a distance of 2μm so that the orientation films were facing each other. The rubbing directions were arranged parallel to each other with respect to the two substrates.

Ferroelectric liquid crystal, ZLI-3654, available from E. Merck Co., was charged at 100° C. into the space between the two substrates to obtain liquid crystal display devices of Examples 5 and 6.

EXAMPLES 7 AND 8

A circular disk-shaped electrode with an electrode area of 2 $cm^2$ was formed, by sputtering of ITO, on each of 1.1 mm thick #7059 glass substrates available from Corning Co. Methyl cellulose (MC) was spincoated on the substrate. The MC film-coated substrate was dried at 120° C. for 1 hour, followed by placing in carbon tetrachloride and introducing 0.1% of each of organic silicon compounds having a trifluoromethyl group, indicated in Table 1, while agitating the liquid by a mechanical stirrer. After reaction at 25° C. for 10 minutes, the respective substrates were washed with chloroform and dried at 25° C. to obtain liquid crystal orientation films of Examples 7 and 8.

The respective orientation films were rubbed on the surface thereof. Two substrates were bonded with an adhesive at a distance of 2μm so that the orientation films were facing each other. The rubbing directions were arranged parallel to each other with respect to the two substrates.

Ferroelectric liquid crystal, ZLI-3654, available from E. Merck Co., was charged at 100° C. into the space between the two substrates to obtain liquid crystal display devices of Examples 7 and 8.

COMPARATIVE EXAMPLES 1 AND 2

The same substrates as used in Examples 1 to 8 were used, on which polyvinyl alcohol as used in the foregoing examples was spincoated on the respective substrates, followed by drying at 120° C. for 1 hour. The thus coated substrates were kept in carbon tetrachloride. While the liquid was agitated by means of a mechanical stirrer, 0.1% of each of organic silicon compounds indicated in Table 1 was introduced. After reaction at a room temperature for 10 minutes, the substrates were washed with chloroform, followed by drying at 25° C. to obtain liquid crystal orientation films of Comparative Examples 1 and 2. The respective orientation films were rubbed on the surface thereof, after which two substrates were bonded with an adhesive at a distance of 2μm so that the orientation films were facing each other. The rubbing directions were arranged parallel to each other with respect to the two substrates.

Ferroelectric liquid crystal, ZLI-3654, available from E. Merck Co., was charged at 100° C. into the space between the two substrates to obtain liquid crystal display devices of Comparative Examples 1 and 2.

COMPARATIVE EXAMPLE 3

The same substrates as used in Examples 1 to 8 were used, on which polyvinyl alcohol was spincoated on the respective substrates. The thus coated substrates were kept in carbon tetrachloride without any thermal treatment. While the liquid was agitated, 0.1% of each of organic silicone compounds used in Example 1 was introduced. After reaction at 25° C. for 10 minutes, the substrates were washed with chloroform. After drying at 25° C., a part of the PVA film was separated from the substrates and thus, they could not be used as the liquid crystal orientation film.

EVALUATION OF ALIGNMENT PROPERTIES AND THERMAL STABILITY

These liquid crystal display devices were observed through a microscope under cross-nicoled conditions with respect to the orientation. The thermal stability was determined by allowing the device to stand at 120° C. for 10 hours and cooling, after which the change in the orientation was observed under cross-nicoled conditions. The liquid crystal display devices of Examples 1 to 8 exhibited homogeneous orientation. However, with the liquid crystal display device of Comparative Example 1 having an orientation film which has an organic silicon compound having two carbon atoms on the surface thereof, random orientation was observed. The liquid crystal display device of Comparative Example 2 which has an orientation film having an organic silicon compound containing 18 carbon atoms was homogeneously oriented prior to heating, but random orientation was observed after heating.

In the examples, the ferroelectric liquid crystal display devices were made, but the liquid crystal orientation film of the invention is not limited to the ferroelectric liquid crystal display device. For instance, the orientation film can be applied, for example, to TN liquid crystal display devices, STN liquid crystal display devices and SH liquid crystal display devices.

TABLE

| | Precursor for Orientation-Control Film | Support Film | Orientation Property | Thermal Resistance |
|---|---|---|---|---|
| Example 1 | $Cl_3Si(CH_2)_2CF_3$ | PVA | good | good |
| Example 2 | $Cl_3Si(CH_2)_2(CF_2)CF_3$ | PVA | good | good |
| Example 3 | $(H_3CO)_3Si(CH_2)_2(CF_2)_3CF_3$ | PVA | good | good |
| Example 4 | $(H_3CH_2CO)_3Si(CH_2)_2(CF_2)_3CF_3$ | PVA | good | good |
| Example 5 | $Cl_3Si(CH_2)_2CF_3$ | PEO | good | good |
| Example 6 | $Cl_3Si(CH_2)_2(CF_2)CF_3$ | PEO | good | good |
| Example 7 | $Cl_3Si(CH_2)_2CF_3$ | MC | good | good |
| Example 8 | $Cl_3Si(CH_2)_2(CF_2)CF_3$ | MC | good | good |
| Comparative Example 1 | $Cl_3SiCH_2CF_3$ | PVA | random | random |
| Comparative Example 2 | $Cl_3Si(CH_2)_{18}CH_3$ | PVA | homogeneous | random |

What is claimed is:

1. A liquid crystal display device comprising a pair of opposing substrates each having an electrode at a surface facing the other, a liquid crystal provided between the pair of substrates, and a liquid crystal orientation film formed on at least one of the substrates at the side on which the electrode is formed and comprising a support film formed on the substrate, and an orientation control film formed on and chemically coupled with the support film and having a trifluoromethyl group.

2. The liquid crystal display device according to claim 1, wherein said orientation-control film comprises an organic silicon compound containing a trifluoromethyl group.

3. The liquid crystal display device according to claim 1, wherein said support film comprises a polymer having a hydroxyl group.

4. The liquid crystal display device according to claim 1, wherein said support film comprises polyvinyl alcohol.

* * * * *